(12) United States Patent
Hayner et al.

(10) Patent No.: US 11,189,825 B2
(45) Date of Patent: Nov. 30, 2021

(54) GRAPHENE-ENCAPSULATED ELECTROACTIVE MATERIAL FOR USE IN A LITHIUM ION ELECTROCHEMICAL CELL

(71) Applicant: SINODE SYSTEMS, INC., Chicago, IL (US)

(72) Inventors: Cary Michael Hayner, Chicago, IL (US); Francis Wang, Chicago, IL (US); Christine A. Frysz, Orchard Park, NY (US)

(73) Assignee: NANOGRAF CORPORATION, Chicago, IL (US)

( * ) Notice: Subject to any disclaimer, the term of this patent is extended or adjusted under 35 U.S.C. 154(b) by 332 days.

(21) Appl. No.: 15/350,271

(22) Filed: Nov. 14, 2016

(65) Prior Publication Data

US 2017/0141387 A1    May 18, 2017

Related U.S. Application Data

(60) Provisional application No. 62/255,344, filed on Nov. 13, 2015.

(51) Int. Cl.
| | |
|---|---|
| *H01M 4/36* | (2006.01) |
| *H01M 4/134* | (2010.01) |
| *H01M 4/38* | (2006.01) |
| *H01M 4/587* | (2010.01) |
| *H01M 4/136* | (2010.01) |

(Continued)

(52) U.S. Cl.
CPC .......... *H01M 4/366* (2013.01); *H01M 4/134* (2013.01); *H01M 4/136* (2013.01); *H01M 4/386* (2013.01); *H01M 4/587* (2013.01); *H01M 4/622* (2013.01); *H01M 4/625* (2013.01);

(Continued)

(58) Field of Classification Search
None
See application file for complete search history.

(56) References Cited

U.S. PATENT DOCUMENTS

| | | |
|---|---|---|
| 8,551,650 B2 | 10/2013 | Kung et al. |
| 2013/0004798 A1 | 1/2013 | Huang et al. |

(Continued)

FOREIGN PATENT DOCUMENTS

| | | |
|---|---|---|
| CN | 101454243 A | 6/2009 |
| CN | 101924211 A | 12/2010 |

(Continued)

OTHER PUBLICATIONS

International Preliminary Report and Written Opinion of the International Search Authority for International Patent Application No. PCT/US2016/061769, dated May 24, 2018, 8 pages.

(Continued)

*Primary Examiner* — Tracy M Dove
(74) *Attorney, Agent, or Firm* — The Marbury Law Group PLLC

(57) ABSTRACT

An electrochemically active material including composite particles that each include a graphene-based material shell surrounding nanoparticles of a core material. The composite particles may include a BET surface area of less than about 75 m²/g. The electrochemically active material may be formed into an electrode incorporated within a lithium ion electrochemical cell.

18 Claims, 4 Drawing Sheets

(51) Int. Cl.
  *H01M 4/62* (2006.01)
  *H01M 10/0525* (2010.01)
  *H01M 4/02* (2006.01)
(52) U.S. Cl.
  CPC .. *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2013/0040204 A1* | 2/2013 | Liu | H01M 4/386 429/231.95 |
| 2013/0199605 A1 | 8/2013 | Huang et al. | |
| 2013/0344392 A1 | 12/2013 | Huang et al. | |
| 2014/0022700 A1 | 1/2014 | Zhao et al. | |
| 2014/0272592 A1* | 9/2014 | Thompkins | H01M 4/1395 429/231.8 |
| 2014/0294981 A1* | 10/2014 | Fichtner | C01G 49/08 424/490 |
| 2017/0005328 A1* | 1/2017 | Xie | H01M 4/366 |
| 2017/0222219 A1* | 8/2017 | Sun | H01M 4/13 |
| 2018/0090768 A1* | 3/2018 | Duan | C01B 32/194 |

FOREIGN PATENT DOCUMENTS

| | | |
|---|---|---|
| CN | 104269534 A | 1/2015 |
| CN | 105047890 A | 11/2015 |
| WO | WO2015/148635 A1 | 10/2015 |

OTHER PUBLICATIONS

Gan, L. et al., "A facile synthesis of graphite/silicon/graphene spherical composite anode for lithium-ion batteries," Electrochimica Acta, vol. 104, pp. 117-123, (2013).

U.S. Appl. No. 14/745,747, filed Jun. 22, 2015, SiNode Systems, Inc.

International Search Report and Written Opinion of the International Search Authority for International Patent Application No. PCT/US2016/061769, dated Feb. 16, 2017, 11 pages.

Choi, S. H. et al., "Rapid continuous synthesis of spherical reduced graphene ball-nickel oxide composite for lithium ion batteries," Scientific Reports, 2014, vol. 4, No. 5786, internal pp. 1-7, Abstract, (2014).

Zhou, W. et al., "A general strategy toward graphene@ metal oxide core-shell nanostructures for high-performance lithium storage," Energy & Environmental Science, 2011, vol. 4, No. 12, pp. 4954-4961, (2011).

He et al., "A novel bath lily-like graphene sheet-wrapped nano-Si composite as a high performance anode material for Li-ion batteries" RSC Advances, 2011, 1, 958-960.

Zhao, et al., "In-Plane Vacancy-Enabled High-Power Si-Graphene Composite Electrode for Lithium-Ion Batteries," Adv. Energy Mater. 2011, 1, 1079-1084.

Yoshio, M., et al., "Carbon-Coated Si as a Lithium-Ion Battery," Anode Material. J. Electrochem. Soc. 2002, 149, A1598-A1603.

Liu, N. et al. "Yolk-Shell Design for Stabilized and Scalable Li-Ion Battery Alloy Anodes," ACS Publications, American Chemical Society, Nano Letter vol. 12, pp. 3315-3321, (2012).

Luo, et al., "Compression and Aggregation-Resistant Particles of Crumpled Soft Sheets". ACS Nano 2011, 5, 8943-8949.

First Office Action from China National Intellectual Property Administration ("CNIPA") for PRC (China) Patent Application No. 201680066104.X, dated Aug. 3, 2020, 11 pages.

Second Office Action from China National Intellectual Property Administration ("CNIPA") for PRC (China) Patent Application No. 201680066104.X, dated Apr. 25, 2021, 10 pages.

* cited by examiner

GRAPHENE-ENCAPSULATED ELECTROACTIVE MATERIAL FOR USE IN A LITHIUM ION ELECTROCHEMICAL CELL

CROSS-REFERENCE TO RELATED APPLICATION

This application claims priority from U.S. Provisional Patent Application Ser. No. 62/255,344, filed Nov. 13, 2015.

TECHNICAL FIELD

Aspects of the present invention relate to new and improved electrochemically active materials, electrodes including the active material, and electrochemical cells including the electrodes.

BACKGROUND

Lithium (Li) ion electrochemical cells typically have a relatively high energy density and are commonly used in a variety of applications which include consumer electronics, wearable computing devices, military mobile equipment, satellite communication, spacecraft devices and electric vehicles. Lithium ion cells are particularly popular for use in large-scale energy applications such as low-emission electric vehicles, renewable power plants, and stationary electric grids. Additionally, lithium-ion cells are at the forefront of new generation wireless and portable communication applications. One or more lithium ion cells may be used to configure a battery that serves as the power source for these applications. The explosion in the number of higher energy demanding applications and the limitations of existing lithium-ion technology are accelerating research for higher energy density, higher power density, higher-rate charge-discharge capability, and longer cycle life lithium ion cells.

Lithium ion cells generally include an anode, for example, graphite, a carbonate-based organic electrolyte, and a cathode comprising a cathode active material, for example, lithium cobalt oxide ($LiCoO_2$). Lithium ions are intercalated and deintercalated between the anode and the cathode through the electrolyte during discharge and charge. When electrical energy is removed from the cell to supply power, or is discharging, lithium ions move from the negative electrode (anode) to the positive electrode (cathode). When the cell is supplied electrical energy for conversion to stored chemical energy or is charging, the opposite occurs. Lithium ions generally move from the positive electrode (the cathode) to the negative electrode (the anode) during charging. For example, the theoretical capacities of a graphite anode and a $LiCoO_2$ cathode are 372 mAh/g and less than 160 mAh/g, respectively. These theoretical charge capacities, however, are often too low for the recent surge in higher energy demanding applications.

Incorporating silicon within a carbon-based anode significantly increases the capacity of the anode material. Silicon has a theoretical capacity of about 4,200 mAh/g which significantly increases cell capacity when incorporated within an electrode comprising graphite, graphene, or other carbon-based active material. Examples of electrodes comprising graphene and silicon are provided in U.S. Pat. No. 8,551,650 to Kung et al. and U.S. patent application publication number 2013/0344392 to Huang et al., both of which are incorporated herein by reference.

Furthermore, it is generally understood that silicon that is incorporated within these electrodes typically undergoes a significant volume expansion of up to 400 percent upon the insertion and extraction of lithium during the cycling process. As a result of this significant volume increase, the silicon within the electrode structure experiences a significant mechanical stress which typically causes the material to fracture and impart defects within its structure. Such structural degradation of the silicon within the active electrode material leads to a reduction in intercalation and de-intercalation of the lithium ions within the active electrode material which causes a reduction in capacity and cycle life. In addition, the mechanical degradation of the silicon typically results in electrical disconnection of the silicon within the active electrode material, which generally leads to a further reduction of Coulombic efficiency and capacity retention.

Accordingly, there is a need for a lithium cell with increased capacity and cycle life.

SUMMARY

The present application discloses, among other things, an electrochemically active composite material, and method of synthesizing the same comprising a shell of graphene, graphene oxide, or reduced graphene oxide that encases an electrochemically active material, such as silicon. The resulting composite particle comprising the electrochemically active material of the present application may have a structure engineered to be of a substantially crumpled, paper ball-like structure, a substantially spherical-like shape or may have a shape that is between or a hybrid of the two extremes. Unlike flat sheets, round structures generally have both high free volume and high compressive strength and can be tightly packed. Such properties would be highly desirable for graphene-based material sheets, since they tend to aggregate in solution and restack in solid state, making their properties highly dependent on the material processing history. Accordingly, the graphene composite particles of the present disclosure are synthesized by capillary compression by rapidly evaporating aerosol droplets.

The composite particle structure of the electrochemically active material comprises a shell having void space within the shell structure that allows for the mechanical expansion of the electrochemically active particles, i.e., silicon therewithin. As a result, the silicon particles remain intact, thereby minimizing capacity loss. In addition, further reduction in cell capacity is minimized. Thus, the lithium ions within the cathode active material are more fully utilized to generate reversible capacity through the active exchange of lithium ions between the anode and cathode. As a result, the intended capacity of the cathode and of the lithium-ion cell is preserved, minimizing reduced capacity, particularly over a significant number of charge/discharge cycles.

In another aspect, a method of synthesizing electrochemically active composite particles is disclosed that comprises the steps of forming a graphene dispersion solution with graphene-based material sheets, forming aerosol droplets from the graphene dispersion solution, and forming composite particles from the aerosol droplets. The step of forming the composite particles includes passing the aerosol droplets through a preheated channel at a predetermined temperature by a carrier gas, and drying the aerosol droplets to concentrate and compress them into the composite particles. In one embodiment, the channel may be a vertical drying chamber. In an embodiment, the composite particles preferably have a particle size greater than 1 micrometer with a surface area less than 80 $m^2/g$.

Huang et al. in U.S. patent application publications 2013/0004798 and 2013/0344392 discloses the formation of a crumpled sub-micron graphene encapsulated silicon capsules. The sub-micron capsules have a crumpled paper ball-like structure with a roughened surface morphology characterized by multiple surface folds, ripples, and creases. Huang discloses that the sub-micron particle size allows for faster diffusion of lithium ions and, thus, provides for a faster/charge cycle relative to larger sized particles. In contrast to Huang, the particles of the electrochemically active material of the present application have a larger particle size with a relatively lower surface area. The applicants have discovered that increasing the particle size and reducing the surface area of the electrochemically active material increases Coulombic efficiency, particularly, the first Coulombic efficiency (FCE).

In some embodiments, the electrochemically active material of the present application has an average particle size that ranges from fpm to about 20 µm with an average surface area less than 80 $m^2/g$ and in some embodiments, less than 40 $m^2/g$. The reduced surface area translates into fewer active sites thereon for the electrolyte to decompose and create a solid electrolyte interphase (SEI). Therefore, the reduced surface area serves to decrease the loss of lithium ions ($Li^+$) and amount of electrolyte that is reacted on the active material surface. As a result, the reduced surface area provides for lithium ion cells that exhibit greater Coulombic efficiencies, particularly increased first Coulombic efficiencies, and higher overall energy density. For example, Huang reports a first Coulombic efficiency (FCE) of about 73 percent and a gravimetric capacity of about 1,200 mAh/g. In contrast, the electrochemically active material of the present application exhibits a first Coulombic efficiency (CFE) of about 87 percent and a gravimetric capacity of about 2,000 mAh/g.

It is further noted that Huang discloses a loading of active material of about 0.2 mg per $cm^2$ area of the electrode. In contrast, the electrodes disclosed in the present application were constructed having a loading of active material of about 1.2 mg per $cm^2$ area, a loading about six times greater than Huang. The applicants have discovered that electrodes of a thinner construction, having a reduced loading of active material, such as those of Huang in comparison to the electrodes disclosed in the present application, typically exhibit increased Coulombic efficiencies due to the thinner electrode construction and not due to the properties of the active material. Thus, the increased first Coulombic efficiencies exhibited by the cells constructed with the electrochemically active material of the present application is not obvious.

The unique structure of the particles of the electrochemically active material of the present invention, particularly, composite particles having a decreased surface area, improves the electrochemical performance of the resulting lithium ion cell. The applicants have discovered that by decreasing the particle surface area while keeping the particle size constant, results in increased specific capacity and Coulombic efficiency of the electrochemically active material, as compared to the prior art.

It is further noted that the particle structure of the electrochemically active material of the present application is significantly different than the active material disclosed by He et al. in "A Novel Bath Lily-Like Graphene Sheet-Wrapped Nano-Si Composite as a High Performance Anode Material for Li-Ion Batteries" *RSC Adv.* 2011, 1, 958-960. He, in contrast to the present application, discloses an active material having a particle structure in which silicon nanparticles are individually wrapped with graphene sheets within the interior of the particle. Because the silicon nano-particles of He are individually wrapped, the silicon particles within the composite particle are held more rigidly in place and subsequently are not allowed to expand. As a result, the material of He exhibits reduced cyclic stability and coulombic efficiency in comparison to the material of the present application.

One embodiment of the present application provides an electrochemically active material comprising composite particles, each composite particle comprising a core material encapsulated within a shell comprising reduced graphene oxide, graphene oxide, or a combination thereof, wherein the composite particles have a BET surface area of less than 75 $m^2/g$.

Another embodiment of the present application provides an electrode comprising an electrochemically active material comprising composite particles, each composite particle comprising a core material encapsulated within a shell comprising reduced graphene oxide, graphene oxide, or a combination thereof, wherein the composite particles have a BET surface area of less than 75 $m^2/g$ and a binder.

One embodiment of the present application provides an electrochemical cell comprising an anode comprising an electrochemically active material comprising composite particles, each composite particle comprising a core material encapsulated within a shell comprising reduced graphene oxide, graphene oxide, or a combination thereof, wherein the composite particles have a BET surface area of less than 75 $m^2/g$ and a binder; a cathode; a casing housing the anode and cathode; and an electrolyte disposed between the anode and cathode.

Another embodiment of the present application provides a method of fabricating an electrochemically active material, the method comprising forming a dispersion comprising a solvent, graphene oxide, and silicon nanoparticles; nebulizing the dispersion to form droplets; and heating the droplets at a temperature ranging from about 100° C. to about 300° C. to form composite particles.

Other principal features and advantages of the invention will become apparent to those skilled in the art upon review of the following drawings, the detailed description, and the appended claims.

DETAILED DESCRIPTION

Figure 1:
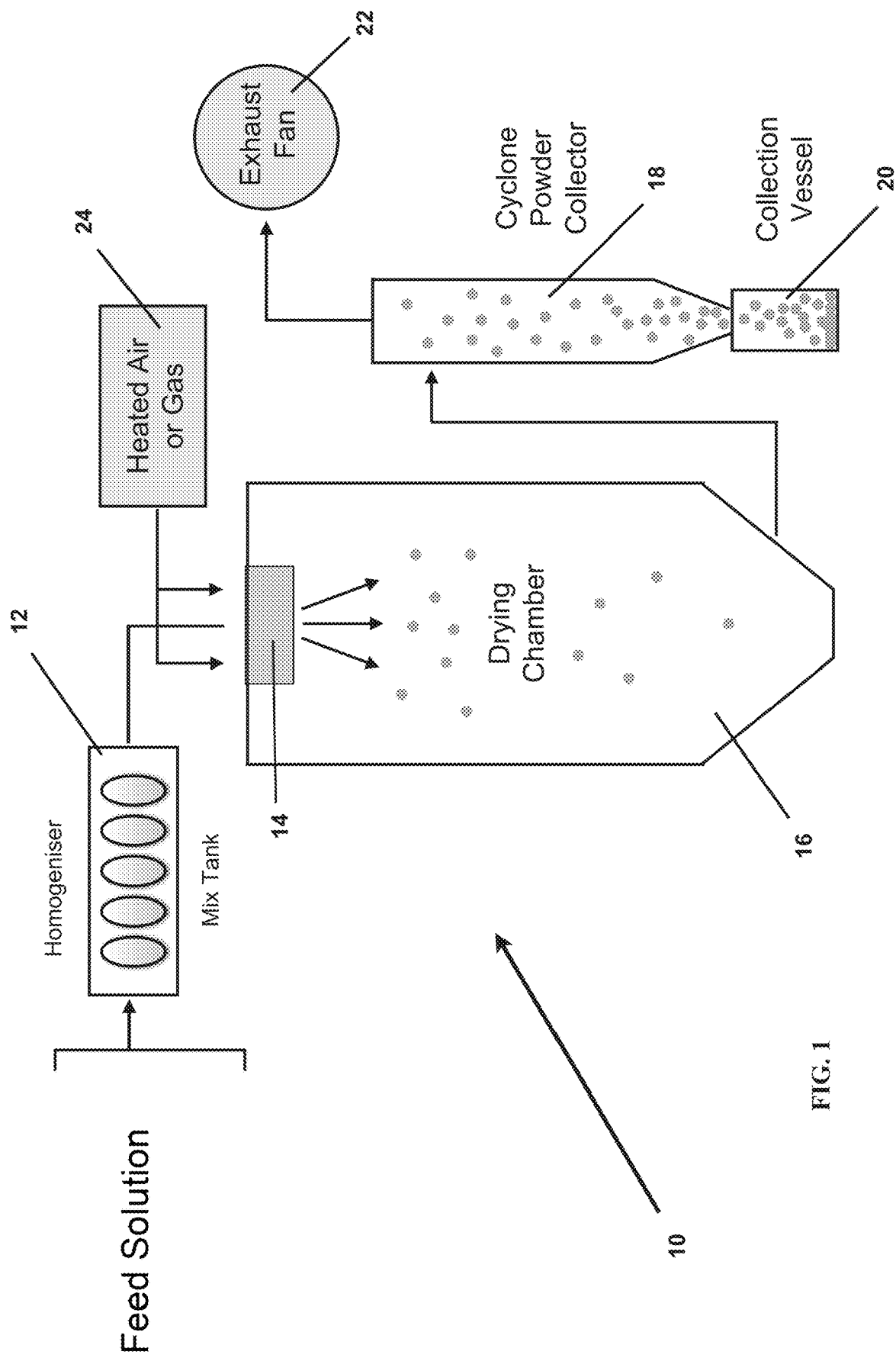
FIG. 1 illustrates a preferred embodiment of the apparatus and processing steps used to prepare particles of the electrochemically active material of the present application.

The present application provides an electrochemically active material comprising graphene and silicon for incorporation into an electrode of a lithium ion electrochemical cell having increased capacity and cycle life. More specifically, the electrochemically active material of the present application comprises particles in which graphene or graphene oxide encapsulate silicon particles.

Silicon is a promising high capacity anode material for lithium ion electrochemical cells. However, the large volume fluctuation upon $Li^+$ insertion/extraction can fracture the material, leading to fast capacity fading due to the loss of electrical continuity. Another problem is that cracking exposes a new surface of silicon to the electrolyte solvents, which can decompose at a low potential to deposit a solid electrolyte interface (SEI) layer of lithiated compounds on the new silicon surface. During charge/discharge cycling, the insulating SEI layer can grow thicker, which further degrades the capacity and cycling stability of the silicon anode. In an operating electrochemical cell, continuous growth of the SEI layer will also gradually deplete the available lithium ions and the amount of electrolytes, thus, deteriorating the overall electrochemical performance.

Theoretical and in-situ transmission electron microscopy (TEM) studies have shown that the strain induced by the expansion/contraction can be accommodated in silicon nanoparticles with diameters <150 nm. It has also been shown that various silicon nanostructures including nanowires, nanotubes, hollow spheres, nanoparticles and nanoporous silicon can withstand $Li^+$ insertion/removal without significant cracking or fracture. However, the formation of SEI layers on these bare silicon nanostructures limits their Coulombic efficiency to <99% even after reaching steady state, which can drain the cathode and electrolyte in only tens of cycles. In comparison, the Coulombic efficiency of graphite anodes can readily reach 99% after the first few cycles. One way to prevent the deposition of SEI on silicon is to avoid its direct contact with the electrolyte solvent by applying a surface coating, which needs to be electrically conducting and permeable to $Li^+$. Carbon based materials have been used for this purpose. (See, Yoshio, M.; Wang, H. Y.; Fukuda, K.; Umeno, T.; Dimov, N.; Ogumi, Z., Carbon-Coated Si as a Lithium-Ion Battery Anode Material. J. Electrochem. Soc. 2002, 149, A1598-A1603; Zhao, X.; Hayner, C. M.; Kung, M. C.; Kung, H. H., In-Plane Vacancy-Enabled High-Power Si-Graphene Composite Electrode for Lithium-Ion Batteries. Adv. Energy Mater. 2011, 1, 1079-1084; and He, Y. S.; Gao, P. F.; Chen, J.; Yang, X. W.; Liao, X. Z.; Yang, J.; Ma, Z. F., A Novel Bath Lily-Like Graphene Sheet-Wrapped Nano-Si Composite as a High Performance Anode Material for Li-Ion Batteries. RSC Adv. 2011, 1, 958-960.)

However, a conformal carbon coating on silicon typically ruptures upon volume expansion, exposing the silicon to electrolytes for SEI deposition. Therefore, carbon coatings that can accommodate the large volume expansion/contraction of silicon are needed. This can be achieved by introducing void space between silicon and its carbon coating. For example, very recently Liu et al., reported a yolkshell design of carbon encapsulated silicon with high coulombic efficiency up to 99.84% from cycle 500 to 1000 (See, Liu, N.; Wu, H.; McDowell, M. T.; Yao, Y.; Wang, C.; Cui, Y., A Yolk-Shell Design for Stabilized and Scalable Li-Ion Battery Alloy Anodes. Nano Lett. 2012, D01: 10.1021/n13014814.) Their approach was to first partially oxidize the silicon nanoparticles to form a $SiO_2$ surface layer and then form a thin shell coating of polymer, which was later pyrolyzed to amorphous carbon. Upon HF etching to remove $SiO_2$ and reduce the size of the silicon nanoparticles, void space was created inside the carbon hollow spheres that can accommodate volume expansion of silicon during lithiation, thus preventing the rupture of the carbon shell and resulting in much improved cycling stability.

The present application discloses a novel electrochemically active composite material, an electrode including the same, an electrochemical cell including the electrode, and a method of fabricating the same. In an embodiment, the electrode of the present invention is an anode or negative electrode that may be used within a secondary lithium-ion electrochemical cell.

In an embodiment, the electrochemically active composite material comprises micron-sized composite particles, comprising graphene oxide sheets that form a shell that encapsulates an internal cargo comprising nanostructures. Examples of the nanostructures may include, but are not limited to, nanoparticles of silicon, silicon oxide, titanium oxide, graphite, carbon, metal (e.g., silver or platinum), salts, such as CsCl, and combinations thereof. In an embodiment, the micron-sized composite particles each comprise silicon nanoparticles encased within a graphene or reduced graphene oxide shell. Such composite particles can be used as anode materials in lithium ion electrochemical cells.

As used herein, the term "micron-sized" refers to particles having widths or diameters ranging from about 1 micrometer (1 µm) to about 20 micrometers (20 µm). The specified widths can be the smallest width (i.e. a width as specified where, at that location, the article can have a larger width in a different dimension), or the largest width (i.e. where, at that location, the article's width is no wider than as specified, but can have a length that is greater).

In some embodiments the average particle size of the composite particles is about 3 µm, and the active material has a surface area of about 40 $m^2/g$. As a result, lithium ion cells constructed with anodes comprising the electrochemically active material of the present application can exhibit a Coulombic efficiency of about 98 percent, or more, over very few cycles at, for example a charge voltage of 1.5 V and a current density of between about 800 to about 1,200 mA/g. In some embodiments, cells may achieve a Coulombic efficiency of at least 98 percent in 20 cycles or less. This includes embodiments of lithium ion cells that achieve a Coulombic efficiency of at least 98 percent in 10 cycles or less and further includes embodiments of lithium ion cells that achieve a Coulombic efficiency of at least 99 percent in 5 cycles or less.

As defined herein a "secondary" electrochemical cell is an electrochemical cell or battery that is rechargeable. "Capacity" is defined herein as the maximum amount of energy, in ampere-hours (Ah), that can be extracted from a battery under certain specified conditions; the amount of electric charge that can be delivered at a rated voltage. Capacity may also be defined by the equation: capacity=energy/voltage or current (A)×time (h). "Energy" is mathematically defined by the equation: energy=capacity (Ah)×voltage (V). "Specific capacity" is defined herein as the amount of electric charge that can be delivered for a specified amount of time per unit of mass or unit of volume of active electrode material. Specific capacity may be measured in gravimetric units, for example, (A·h)/g or volumetric units, for example, (A·h)/cc. Specific capacity is defined by the mathematical equation: specific capacity (Ah/Kg)=capacity (Ah)/mass (Kg). "Rate capability" is the ability of an electrochemical cell to receive or deliver an amount of capacity or energy within a specified time period. Alternately, "rate capability" is the maximum continuous or pulsed output current a battery can provide per unit of time. Thus, an increased rate of charge delivery occurs when a cell discharges an increased amount of current per unit of time in comparison to a similarly built cell, but of a different anode and/or cathode chemistry. "C-rate" is defined herein as a measure of the rate at which a battery is discharged relative to its maximum capacity. For example, a 1C rate means that the discharge current will discharge the entire battery in 1 hour. "Power" is defined as the time rate of energy transfer, measured in Watts (W). Power is the product of the voltage (V) across a battery or cell and the current (A) through the battery or cell. "C-Rate" is mathematically defined as C-Rate (inverse hours)=current (A)/capacity (Ah) or C-Rate (inverse hours)=1/discharge time (h). Power is defined by the mathematical equations: power (W)=energy (Wh)/time (h) or power (W)=current (A)×voltage (V). Coulombic efficiency is the efficiency at which charge is transferred within an electrochemical cell. Coulombic efficiency is the ratio of the output of charge by a battery to the input of charge.

The composite particles can be made by a rapid, one-step capillary driven assembly route in aerosol droplets, as described in greater detail in the example below. The aerosol synthesis route allows a continuous mode of operation and is readily scalable. In one such assembly route, an aqueous dispersion of micron-sized graphene oxide (GO) sheets and silicon nanostructures is nebulized together to form aerosol droplets, which are passed through a preheated vertical drying chamber. During the assembly process, evaporation-induced capillary forces encase the graphene oxide around the second constituent, e.g., Si, in intimate contact therewithin and heavily compress the graphene oxide into a sphere-like composite shell. Alternatively, in an embodiment, each of the components that comprise the particle of the composite electrochemically active material may be processed separately. For example, in one embodiment, the second constituent or constituents may be processed through the aerosolization process after which, the graphene oxide may be separately wrapped or coated around the second constituent or constituents.

In an embodiment, the reduced graphene oxide shell of the resulting composite particle can accommodate the volume expansion of silicon or other constituents upon lithiation with minimized fracture and, thus, help to protect the silicon from excessive deposition of the insulating solid electrolyte interphase. Compared to native Si nanostructures and the active material of Huang, the composite particles and structure thereof of the electrochemically active material of the present application, improve electrochemical performance as a Li ion battery anode in terms of capacity, cycling stability and Coulombic efficiency.

FIG. 1 illustrates an embodiment of an aerosolization apparatus 10 that is preferably used to prepare the particles of the electrochemically active material of the present application. The apparatus preferably comprises a mixing tank 12, an atomizer 14, a drying chamber 16, preferably having a vertical orientation, connected to a powder collector 18, a powder collection vessel 20, and an exhaust 22.

The aerosolization apparatus provides a scalable manufacturing process that allows particles of the electrochemically active material of the present application to have a tailored exterior surface morphology, particle size, and surface area. The various parameters of the aerosolization apparatus and method of fabrication thereof can be modified to thus alter the electrochemical properties of the particles of the electrochemically active material and electrodes thereof. As defined herein, "morphology" is structure and features of a surface. Specifically, as it relates to the present invention, "morphology" is the structure and features of the exterior surface of a particle of the electrochemically active material of the present application. "Surface area" is the total area encompassing the outer surface of a particle of the electrochemically active material including its associated surface topography. Herein topography is defined as deviations in the direction of the normal vector of a real surface from its ideal form. Composite particles having a high degree of crumple typically have an increased surface area as the folds and creases created by the crumpling tend to increase the amount of surface deviations. Likewise, composite particles having a low degree of crumple typically have a reduced surface area as the lack of surface deviations reduces surface area. The surface area of the composite particles of the present application was measured using BET methodology.

In an embodiment, a dispersion is formed in the mixing tank 12 by dispersing sheets of a graphene-based material (e.g., graphene oxide sheets) and an electrochemically active material in a liquid, for example, water, alcohol, or combinations thereof. The dispersion is then provided in the atomizer 14, such as an ultrasonic atomizer, to be nebulized to form aerosol droplets comprising the graphene-based material and the active material. Then, a carrier gas 24 is provided to the atomizer 14 for transferring the aerosol droplets into the drying chamber 16. In an embodiment, the carrier gas 24 may comprise air, an inert gas or other low-responsive gasses. Other examples of carrier gasses may include but are not limited to, compressed air, nitrogen ($N_2$), argon (Ar) or combinations thereof. In a preferred embodiment, the carrier gas 24 is heated to a temperature ranging from about 150° C. to about 300° C., before being provided to the atomizer 14. In an embodiment, the drying chamber 16 may have a temperature that ranges from about 65° C. to about 300° C.

Thus, when the nebulized material (e.g., droplets) passes into the drying chamber 16, rapid evaporation causes shrinkage of the aerosol droplets, first concentrating the graphene-based material sheets and subsequently compressing them into micron scale particles having the active material encapsulated therein. In addition, the heat and/or the gas atmosphere may reduce at least some of the graphene oxide to form reduced graphene oxide. The resulting composite particles enter the cyclone particle collector 18 and the collection vessel 20 which is attached to the particle collector 18. In an embodiment, various parameters of the fabrication process may be modified to manipulate the resulting structure, exterior surface morphology, particle size or surface area of the resulting particles of the electrochemically active material. Such parameters may include but are not limited to, drying temperature, liquid dispersion flow rate, atomizing gas flow rate, carrier gas flow rate, and carrier gas pressure. In general, increasing the drying temperature can affect the structure, surface area, and morphology. In addition, increasing the flow rates of the dispersion and carrier gas generally can affect particle size, surface area, and morphology. Table I illustrates the general effect certain processing parameters may have on the structure, surface area and morphology of the particles of the electrochemically active material. These processing parameters are interdependent and can be custom tailored to fabricate composite particles having a spherical (a lower surface area particle) or crumple morphology (a higher surface area particle). Furthermore, these parameters can be adjusted to achieve a desired degree of crumple or surface roughness.

TABLE I

| Parameter | Effect on Particle |
| --- | --- |
| Drying Temperature | Structure, surface area, morphology |
| Liquid Feed Rate | Particle size, morphology |
| Atomizing Gas Flow Rate | Particle size |

Figure 2:
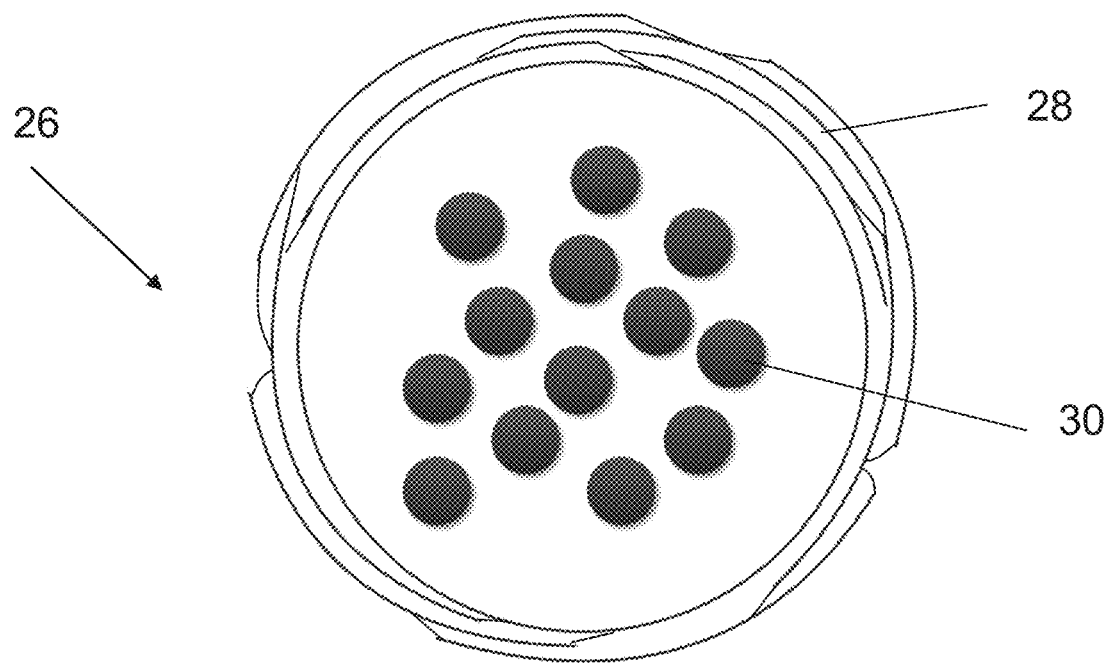
FIG. 2 shows an embodiment of a particle of the electrochemically active material of the present application having a substantially spherical structure.

FIG. 2 illustrates a cross-sectional view of an embodiment of a composite particle 26 of the electrochemically active material of the present invention that comprises a substantially spherical shape. As illustrated, the particle 26 comprises a reduced graphene oxide graphene-based shell 28 that encases electrochemically active nanoparticles 30. The graphene-based shell 28 may be formed of sheets of graphene oxide, reduced graphene oxide, or a combination thereof. The nanoparticles 30 may be formed of an ion insertion and extraction material, such as silicon or the like. As illustrated, the nanoparticles 30 are surrounded and encapsulated within the void space formed by the shell 28. The composite particle 26 may include from about 60 to about 90 weight present of the nanoparticles 30, based on the total weight of the composite particle 26. For example, the composite particle 26 may include from about 65 to about 85 weight percent, such as from about 70 to about 80 weight percent of the nanoparticles 30, based on the total weight of the composite particle 26.

Figure 3:
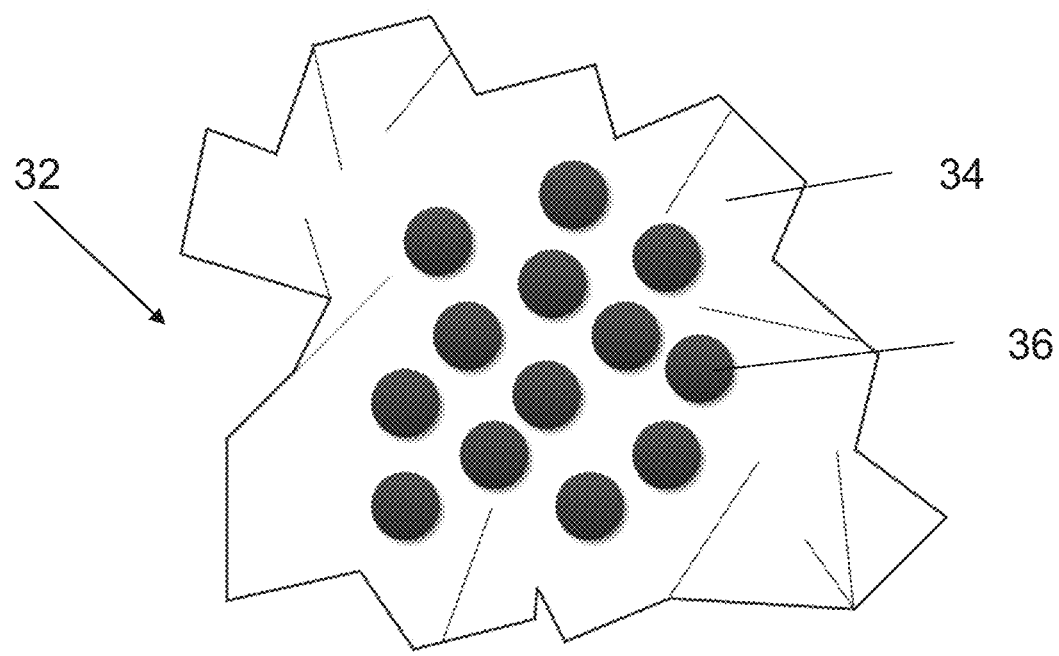
FIG. 3 illustrates an embodiment of a particle of the electrochemically active material of the present application having a substantially crumpled structure.

FIG. 3 illustrates a cross-sectional view of a composite particle 32 having a substantially crumpled shape, according to various embodiments of the present disclosure. As shown, the particle 32 comprises a graphene-base shell 34 that encapsulates electrochemically active nanoparticles 36. The shell 34 and the nanoparticles 36 may be formed of the same materials as described above with regard to FIG. 2.

It is noted that the parameters identified in Table I above, such as drying temperature and liquid feed rate, can be adjusted to produce composite particles having either a smoother surface, as shown in FIG. 2, or a higher degree of crumple as illustrated in FIG. 3.

In an embodiment, the cyclone powder collector 18 may be used to classify and separate the particles of the electrochemically active material based on particle size or particle size distribution. This ability to classify the particles by size may further enable specific particle packing densities of the electrochemically active material and resulting electrode. In particular, the engineered structural shape and/or tailored surface morphology of the particles of the electrochemically active material of the present application may further enable enhanced efficient particle packing and particle density. In addition, the engineered shape of the particles of electrochemically active material of the present application may further increase the density of the resulting electrode. Particle packing density may contribute to the electrochemical performance of the material and resulting electrode and electrochemical cell.

The drying chamber 16 may be of a cylindrical structure that is vertically oriented, lengthwise. This configuration allows for vertical movement of the nebulized droplets/particles therein. In an embodiment, the temperature within the drying chamber 16 may range from about 65° C. to about 300° C., such as from about 100° C. to about 300° C. In addition, it is believed that a vertical orientation and flow of the nebulized droplets/particles may contribute to the formation of the engineered structure and exterior morphology of the composite particles. Other attributes that contribute to the structure and morphology of the composite particles include, but are not limited to, atmospheric conditions, velocity of the droplets/particles within the chamber 16, and population of the droplets/particles within the chamber. For example, movement of the particles within the drying chamber 16 helps disperse the particles and contributes to the formation of the particle shape.

In addition, atmospheric conditions within the drying chamber may also contribute to the structure and electrical performance of the composite particles and resulting electrode. In addition, the particle population within the chamber 16 may contribute to the structure and morphology of the particles as they collide amongst other particles and the chamber sidewall. All of these parameters, at least partially or in combination, may contribute to the formation of the desired particle structure and exterior morphology.

It is important that the aerosol droplets are dried sufficiently fast to evaporate the liquid sufficiently quickly to provide a micron-sized composite particle. This can be accomplished by an appropriate selection of processing conditions, such as an appropriate combination of the size of the initial aerosol droplets, the concentration of materials in the initial dispersion, solvent chemistry, and drying speed, which can be controlled via the drying temperature. In some embodiments, the pre-determined temperature to which the aerosol droplets are exposed in the furnace may be at least about 500° C. For example, the pre-determined temperature may be at least about 600° C. This includes embodiments in which the predetermined temperature is in the range of about 600° C. to 2,000° C. In some embodiments, the predetermined temperature is in the range of about 600° C. to about 800° C. In one embodiment, the predetermined temperature is about 600° C.

In an embodiment of the present method using an apparatus of the type shown in FIG. 1, a second constituent, such as silicon nanoparticles (50-100 nm diameter nanoparticles, for example) in an aqueous suspension is added to a dispersion of micron-sized graphene oxide sheets. The colloidal mixture is then nebulized to form aerosol droplets, which are blown through a preheated drying chamber (at, for example, 225° C.) with air or an inert carrier gas, such as $N_2$ or Ar. As water evaporates, the amphiphilic graphene oxide sheets migrate to the surface of the droplets to form the shell. Since the diameter of the silicon is much smaller than that of the aerosol droplets, further evaporation can collapse the graphene oxide shell, resulting in the desired surface morphology that encapsulates the second constituent, i.e., the silicon particles therewithin. The graphene oxide can be at least partially reduced thermally before reaching the collector, and further reduced after collection by annealing at an elevated temperature for a sufficiently long period of time under an air atmosphere (for example, 250° C. for 2 h). It is noted that at elevated temperatures typically greater than about 300° C., an inert gas such as nitrogen may be used to minimize the possibility of decomposition of the graphene oxide.

Although the process in the embodiment illustrated above uses water as the solvent for the dispersion, the particles and the various constituents that comprise the composite particle may be dispersed in other solvents regardless of their density or polarity with or without a surfactant. Other solvents may include but are not limited to, methanol, isopropanol, acetone, chloroform, tetrahydrofuran, toluene, cyclohexane, dichlorobenzene, ethylene glycol, and combinations thereof.

In an embodiment, the resulting composite particles may have a shell structure composed of at least partially reduced graphene oxide having a substantially spherical structure, similar to the embodiment shown in FIG. 2, a substantially crumpled structure, similar to the embodiment shown in FIG. 3, a combination thereof, or a structure having a degree of crumple. In addition, the resulting composite particle of the electrochemically active material of the present application may comprise a smooth surface morphology, a rough surface morphology, or a combination thereof having a degree of roughness for at least a portion of the exterior surface. The particles of the electrochemically active material of the present application are also aggregation resistant and resistant to strong inter-particle van der Waals attraction. In addition, the particle structures can be custom engineered to enable custom tailored particle packing. For example, the composite particles of the electrochemically active material of the present application may be selectively selected to provide a desired particle size, particle size distribution, surface area or combination thereof. For example, by controlling the particle size distribution, the density of the resulting anode can be adjusted.

The graphene oxide sheets used to make the particles are desirably micron-sized sheets. That is, they have micron-sized widths. As used herein, the terms "micron-sized", "micron-scaled", "microscopic," the "micron-" prefix, and the like generally refers to elements or articles having widths or diameters in the order of micrometers ($10^{-6}$ meters). For example, the sheets may have a width of at least 1 μm. In all embodiments, specified widths can be the smallest width (i.e., a width as specified where, at that location, the article can have a larger width in a different dimension), or largest width (i.e., where, at that location, the article's width is no wider than as specified, but can have a length that is greater).

As used herein, a "nanostructure" refers to an object of intermediate size between molecular and microscopic (micrometer-sized) structures. The second constituent or constituents may have an average particle size of between about 0.1 nm to about 1,000 nm in each spatial dimension. A list of nanostructures includes, but is not limited to, nanoparticles, nanocomposites, quantum dots, nanofilms, nanoshells, nanofibers, nanorings, nanorods, nanowires, nanotubes, and so on. In some embodiments, the nanostructures are nanoparticles characterized by diameters between about 50 and about 100 nm.

Silicon is one example of an electrochemically active material. However, the second constituent may comprise, consist of or consist essentially of other materials, especially those that undergo volume expansion and have low conductivity, solubility or instability in the electrochemical cell electrolyte. Examples of expandable, electrochemically active materials include Sn, Ge, Sb, or other monometallic, bimetallic, or multi-metallic materials, or oxide or sulfide materials, or their mixtures. Some specific examples include metal oxides, such as $TiO_2$, $ZnO$, $SnO_2$, $CO_3O_4$, $Fe_2O_3$, $MnO_2$, $Mn_3O_4$, $MnO$, $Fe_3O_4$, $NiO$, $MoO_2$, $MoO_3$, $CuO$, $Cu_2O$, $CeO_2$, $RuO_2$, $NiO$, carbon and combinations thereof.

The weight percent of the second constituent in the composite particle is relatively high. In some embodiments, the weight percent of the second constituent may be 50 percent or greater. This includes embodiments in which the weight percent of the second constituent is 60 percent, 70 percent, 80 percent or greater of the total weight of the particle. It is noted that increasing the weight percent of the second component, i.e., silicon, within the composite particle generally decreases the surface area of the composite particle.

The resulting plurality of particles has a powder consistency with a preferred real density of about 2.3 g/cc and a tap density that ranges from about 0.10 g/cc to about 1.0 g/cc, most preferably about 0.50 g/cc. As defined herein "real density" is the density of the particles that excludes the volume of pores and void spaces within the particle structures. Real density was determined using a gas pycnometer method. "Tap density" is defined herein as the bulk density of the particles after consolidating the particles together by tapping a measured sample amount against a surface. Tapped density of the resulting powder particles was measured using ASTM method D4781.

It has been previously shown that crumpled graphene oxide (GO) and graphene (i.e., reduced graphene oxide) particles resembling crumpled paper balls can be made by capillary compression of the sheets in evaporating aerosol droplets. (See, Luo, J. Y.; Jang, H. D.; Sun, T.; Xiao, L.; He, Z.; Katsoulidis, A. P.; Kanatzidis, M. G.; Gibson, J. M.; Huang, J. X., "Compression and Aggregation-Resistant Particles of Crumpled Soft Sheets". ACS Nano 2011, 5, 8943-8949.) In addition, as previously mentioned, Huang et al. in U.S. patent application publications 2013/0004798 and 2013/0344392, discloses sub-micron graphene encapsulated silicon capsules that are fabricated using capillary compression of graphene oxide sheets in evaporating aerosol droplets. However, the electrochemically active material of the present application comprises unique structural features that improve electrical performance, specifically, increased specific capacity and Coulombic efficiency of the electrochemically active material, as compared to the material of Huang and the prior art.

The applicants have discovered that the surface area of the resulting electrochemically active material of the present application significantly affects Coulombic efficiency and capacity of lithium ion cells constructed with anodes comprising the electrochemically active material of the present application. It has been discovered that fabricating the electrochemically active composite material to an average particle size of between about 1 μm to about 10 μm with a surface area less than 80 $m^2/g$, preferably less than 40 $m^2/g$, and more preferably less than 10 $m^2/g$, significantly increases the Coulombic efficiency and discharge capacity of the resulting lithium ion cells. In particular, the applicants have discovered that decreasing the composite particle surface area while keeping the composite particle size constant, increases Coulombic efficiency and discharge capacity of the resulting lithium ion cells as shown in Table III. Decreasing surface area while keeping the particle size constant is counterintuitive as particle surface area generally increases with decreasing particle size. The applicants have discovered that by controlling and adjusting the processing parameters, as illustrated in Table I, and by adjusting the weight ratio of silicon in comparison to graphene oxide, the resulting composite particles of the electrochemically active material can be specifically engineered to have a lower surface area while keeping particle size constant. In an embodiment, as shown in Tables II and III increasing the amount of silicon, particularly increasing the silicon:graphene weight ratio greater than 70:30 within the composite particle tends to decrease the surface area of the composite particles.

Electrochemical test results indicate that lithium ion cells constructed with anodes comprising the composite electrochemically active material of the present application having a reduced particle surface area exhibit improved Coulombic efficiencies and increased capacity. This relationship between surface area of the electrochemically active material of the present application and increased Coulombic efficiency and capacity is believed to be attributed to decreased electrolyte decomposition on the active surface areas with SEI formation. Decreased SEI formation due to lower surface areas leads to increased coulombic efficiency.

The particles of the electrochemically active material of the present invention are well suited for use as anode materials in lithium ion electrochemical cells for a number of reasons. First, graphene is highly electrically conductive and lithium transportable. Second, the engineered particle shape and void space therewithin allow for the second constituent to expand and contract freely, without rupturing the graphene shell.

Third, the mechanically stable graphene shell can isolate the second constituent, preventing them from contacting the electrolyte solvents and, thus, a stable SEI layer can form only outside the graphene shell. Fourth, the channels within the particle stack of the electrode allow electrolyte to transport easily.

Fifth, unlike hollow spheres, the structure of the particle can clasp the nanostructures therewithin, thus preventing aggregation of the second constituent during the charge/discharge cycle of the cell. And, sixth, the aerosol flow process is compatible with electrode slurry coating techniques.

Figure 4A:
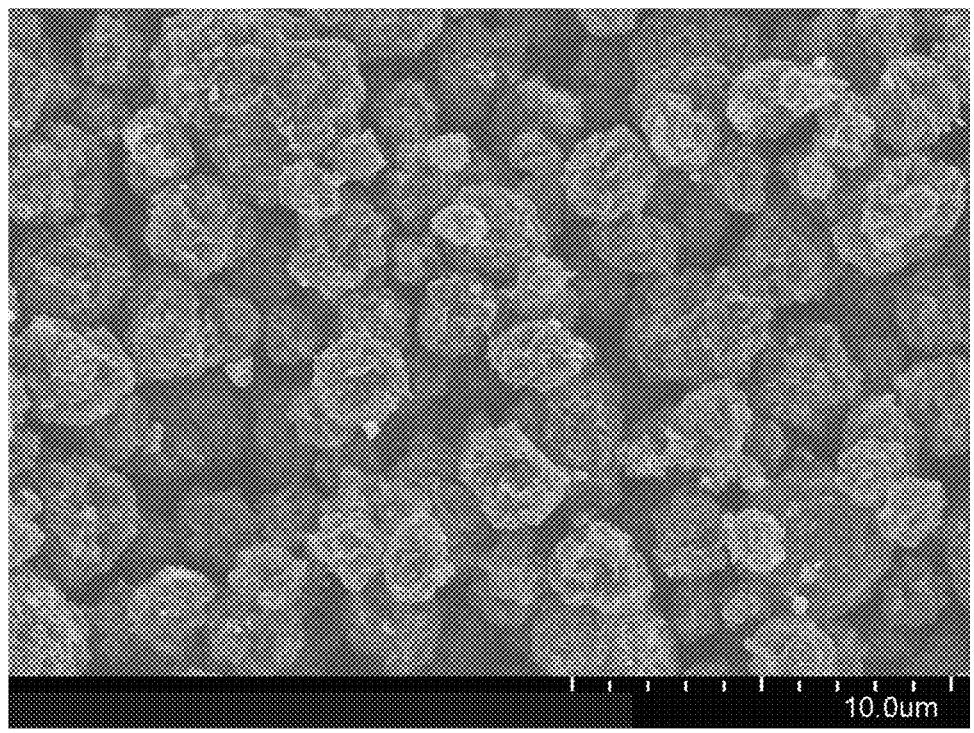
FIGS. 4A and 4B are scanning electron microscope images showing a magnified image of a particle of the electrochemically active material of the present application comprising a reduced graphene oxide outer shell and a second constituent of silicon encapsulated therewithin.
Figure 4B:
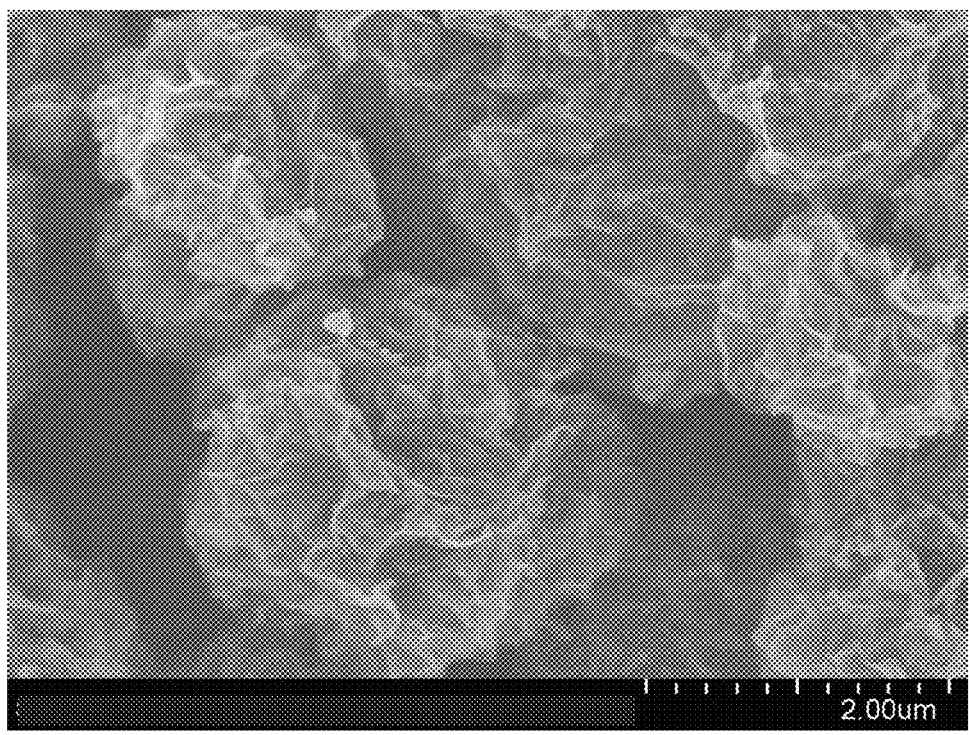

FIGS. 4A and 4B are scanning electron microscope (SEM) images that illustrate embodiments of the composite particles of the electrochemically active material of the present application. As shown, the composite particles comprise a reduced graphene oxide shell that encapsulates a second constituent comprising a plurality of silicon particles randomly positioned within the reduced graphene oxide shell. As shown in the images, the graphene shells were compressed having a slightly crumpled structure and roughened surface morphology.

Electrochemically Active Material Preparation

Example 1

Composite particles of an electrochemically active material comprising silicon encapsulated in reduced graphene oxide were synthesized. In an embodiment a dispersion comprising graphene oxide having an average particle size of about 1 μm and silicon having an average particle size of about 50-100 nm were mixed in deionized water. The silicon comprised about 48 weight percent of the total dispersion and the graphene oxide comprised about 52 weight percent of the total dispersion. The particles were passed through a preheated vertical drying chamber at a temperature of about 200° C. with air as the carrier gas at a rate of 35 m$^3$/h. The resulting composite particles had a silicon to reduced graphene oxide weight ratio of 70:30. The resulting composite particles had an average particle size of about 3 μm and an average BET surface area of about 60 m$^2$/g.

Example 2

Composite particles of an electrochemically active material comprising silicon encapsulated in reduced graphene oxide were synthesized. In an embodiment, a dispersion comprising graphene oxide having an average particle size of about 1 μm and silicon having an average particle size of about 50-100 nm were mixed in deionized water. The silicon comprised about 53 weight percent of the total dispersion and the graphene oxide comprised about 47 weight percent of the total dispersion. The particles were passed through a preheated vertical drying chamber at a temperature of about 200° C. with air as the carrier gas at a rate of 20 m$^3$/h. The resulting composite particles had a silicon to reduced graphene oxide weight ratio of 80:20. The resulting composite particles had an average particle size of about 3.3 μm and an average BET surface area of about 40 m$^2$/g.

Comparative Example

Composite particles of an electrochemically active material comprising silicon encapsulated in reduced graphene oxide were synthesized as a comparative example. In an embodiment a dispersion comprising graphene oxide having an average particle size of about 1 μm and silicon having an average particle size of 50-100 nm were mixed in deionized water. The silicon comprised about 48 weight percent of the total dispersion and the graphene oxide comprised about 52 weight percent of the total dispersion. The particles were then passed through a preheated vertical drying chamber at a temperature of about 190° C. with an air carrier gas at a rate of 35 m$^3$/h. The resulting particles had a silicon to reduced graphene oxide weight ratio of 70:30. The resulting particles had an average particle size of about 3.3 μm and an average BET surface area of about 80 m$^2$/g. Table II below itemizes the processing parameters and resulting properties.

TABLE II

| Example | Average Particle Size (μm) | Average BET Surface Area (m$^2$/g) | Si:Graphene Weight Ratio |
|---|---|---|---|
| Comparative Example | 3.3 | 80 | 70:30 |
| Example 1 | 3.3 | 60 | 70:30 |
| Example 2 | 3.3 | 40 | 80:20 |

In an embodiment, the electrochemically active materials, as described above, were each fabricated into electrodes and incorporated within a lithium electrochemical cell. In an embodiment, the electrochemically active material of the present application is first formed into an electrode slurry comprising the electrochemically active material, a binder, a conductive additive, and a solvent. Appropriate proportions of the electrochemically active material and the other constituents are mixed to form the electrode slurry. Once fabricated, the electrode slurry is applied to a surface of an electrode current collector, composed of an electrically conductive material, such as, but not limited to copper, to create an electrode for use in an electrochemical cell. After the electrode slurry has been applied to the surface of a substrate, such as a current collector, the electrode slurry is dried and calendared to compress the electrode to the desired porosity.

A dispersant (including, but not limited to, surfactants, emulsifiers, and wetting aids), a thickening agent (including clays), defoamers and antifoamers, biocides, additional fillers, flow enhancers, stabilizers, cross-linking and curing agents may be added to the slurry mixture to ensure a homogenous mixture thereof. Examples of dispersants include, but are not limited to, glycol ethers (such as poly(ethylene oxide), block copolymers derived from ethylene oxide and propylene oxide (such as those sold under the trade name Pluronic® by BASF), acetylenic diols (such as 2,5,8,11-tetramethyl-6-dodecyn-5,8-diol ethoxylate and others sold by Air Products under the trade names Surfynol® and Dynol®), salts of carboxylic acids (including alkali metal and ammonium salts), and polysiloxanes. Additional examples of dispersants may include sodium dodecanoate, alkanolamide, lanolin, polyvinylpyrrolidone, sodium alkyl sulfate, sodium alkyl sulfonate, lecithin, polyacrylate, sodium silicate, and polyethoxy, nitrocellulose and Triton® X-100 a dispersant having the chemical formula, $(C_2H_4O)nC_{14}H_{22}O$ produced by DOW Chemical company of Midland Mich. Examples of thickening agents include long-chain carboxylate salts (such aluminum, calcium, zinc, salts of stearates, oleats, palmitates), aluminosilicates (such as those sold under the Minex® name by Unimin Specialty Minerals and Aerosil® 9200 by Evonik Degussa), fumed silica, natural and synthetic zeolites. In an embodiment, the slurry mixture may comprise from about 0.01 to about 1.0 weight percent dispersant and/or thickening agent.

Binders may include but are not limited to, a fluoro-resin powder such as polytetrafluoroethylene (PTFE), polyvinylidene fluoride (PVDF), poly(acrylic) acid, polyethylenetetrafluoroethylene (ETFE), polyamides, and polyimides, and mixtures thereof. Additional binders may include, but are not limited to, polyethylene (UHMW), styrene-butadiene rubber, cellulose, polyacrylate rubber, and copolymers of acrylic acid or acrylate esters with polyhydrocarbons such as polyethylene or polypropylene, and mixtures thereof. Solvents may include but are not limited to, deionized water, ethanol, isopropyl alcohol, ethylene glycol, ethyl acetate, polar protiac solvents, polar aprotic solvents, N-methyl-2-pyrrolidone, and combinations thereof. Conductive additives may include but are not limited to, carbon black, an electrically conductive polymer, graphite, or a metallic powder such as powdered nickel, aluminum, titanium and stainless steel.

In an embodiment, the electrode active slurry of the present application may comprise from about 50 to about 85 weight percent of the active electrode material, from about 10 to about 25 weight percent binder, from about 2 to about 7 weight percent the conductive additive and the remainder comprising the solvent or solvent solution. In an embodiment, the electrode active slurry may have a solids content that ranges from about 15 to about 35 weight percent. In another embodiment, the slurry may have a solids content that ranges from about 20 weight percent to about 30 weight percent. The solids content of the slurry allows for an ideal slurry viscosity that enhances a uniform coating on a substrate or current collector.

Each of the electrode active constituents may be added separately or, alternatively, as separate electrode suspensions comprising at least portions of the active electrode slurry component materials that are combined to create the electrode slurry of the present invention. In an embodiment, the components of the active electrode slurry are mixed to a uniform consistency. The slurry components may be mixed using a variety of unlimited techniques such as ball milling or planetary mixing. Mixing times may range from about 30 minutes to 2 hours depending on batch size to achieve a uniform, homogeneous slurry mixture. Milling media may also be added to the slurry to aid in creating a homogenous mixture. The electrode slurry may be further dispersed through manual or automated agitation. Such agitation may include physical shaking or rocking of the suspension. Also, the electrode slurry may be subjected to ultrasonication for about 30 seconds to about 30 minutes to disperse further the silicon and carbon particles and help to create a homogeneous electrode suspension mixture. The electrode slurry should be prepared such that it can adequately flow and adhere to the surface of the substrate. In an embodiment, the electrode slurry may have a viscosity ranging from about 0.1 Pa·S to about 1,000 Pa·S at a shear rate of between about 0.1 to 1,000 $s^{-1}$.

After the electrode slurry has been formulated, the slurry is applied to the surface of a substrate. In an embodiment, the electrode slurry may be applied to the surface of a substrate comprising a metal, a polymer, a ceramic, and combinations thereof. Non-limiting examples of substrate materials may include but are not limited to, metals such as copper, aluminum, nickel, and their alloys, polymers such as polyethylene, polyimide, and polyether ether ketone (PEEK), as well as alumina and various glasses. In an embodiment, the electrode slurry is applied to the surface of a current collector such as those composed of copper, nickel, aluminum, and combinations thereof.

In an embodiment, the electrode slurry may be applied to the desired thickness ranging from a few nanometers to a few micrometers using a variety of non-limiting application techniques. In an embodiment, the thickness of the applied electrode slurry may range from about 5 μm to about 500 μm. These application techniques may include but are not limited to, the use of Meyer rod coating, the use of a doctor blade or knife, spray coating, dip coating, spin coating or brush application. Also, the electrode slurry layer may be applied to a substrate surface through the use of thick-film or thin-film processing techniques.

Furthermore, in an embodiment, the surface of the substrate may be modified before the application of the electrode slurry to improve adhesion to the substrate surface. Examples of such substrate surface modifications include, but are not limited to, surface etching or surface roughening through the use corona treatment, acid etching, sandblasting or bead blasting.

After the electrode slurry has been applied to the surface of the substrate, it is then dried to remove at least a majority of the solvent. In an embodiment, the electrode slurry layer may be dried using convection air drying, a UV light source and/or an infrared light source. Additionally, the electrode slurry may be dried through the use of freeze drying, vacuum drying, or through osmosis. Also, the slurry may be dried through the application of a heat source that is applied directly to the exposed surface of the electrode slurry coating or, alternatively, the electrode slurry may also be dried through the application of a heat source to the underlying substrate, or both. Furthermore, the electrode slurry may be dried in a variety of non-limiting atmosphere conditions having a variety of atmospheric pressures. For example, a gas such as nitrogen may be used to control the drying process. In an embodiment, the applied electrode slurry is dried under a UV-light source for about 1 hour afterward it is then dried in an oven at about 80° C. for between about 2 to 24 hours, or until the solvent has been substantially removed from the resulting electrode structure.

In an embodiment, the electrode ink is dried to a thickness ranging from about 5 μm to about 50 μm. In another embodiment, the electrode ink is dried to a thickness ranging from about 8 μm to about 15 μm. The thickness of the dried electrode layer(s) may be targeted to achieve an increase in electrical power. The reduced electrode thickness minimizes the diffusion distance and which enables rapid lithium ion migration within the electrode structure.

The drying process of the present application allows for the active electrode material, particularly the composite particles comprising graphene oxide encapsulated silicon or silicon oxide, to maintain the internal void space. Subjecting the dried electrode to further elevated heating conditions, such as sintering, may lead to a decrease in electrical conductivity of the material and also, may cause the silicon or silicon oxide within the particle to become fused to the graphene or graphene oxide. As a result, the capacity generated by the particles may decrease.

After the slurry is dried, the formed electrode may be calendered. In an embodiment, the calendaring process compresses the electrode thus decreasing the void space within the dried electrode. In another embodiment, the dried electrode may be calendered to achieve a target void space and internal porosity that provides for increased lithium diffusion, in addition to structural integrity. In an embodiment, the calendaring process may utilize a roller, or another such tool, that is rolled over the dried electrode to ensure a proper internal porosity. In an embodiment, the calendaring process may range from about 30 seconds to about 5 minutes depending on the thickness of the electrode and the desired internal porosity. In an embodiment, the internal electrode porosity may range from about 40 percent to about 60 percent, or the internal porosity may be about 50 percent. Internal porosity is measured by the following equation:

$$\text{Porosity}(\%) = 1 - \left(\frac{\text{measured density}}{\text{theoretical density}}\right)$$

where the measured density is measured by dividing the mass of the dried electrode by its volume and the theoretical density is the density of the active electrode material that is 100 percent dense. The theoretical density is assumed to be 2.25 g/cubic centimeter. In an embodiment, constructing the electrode to a targeted optimal internal porosity provides additional channels within which lithium ions may diffuse while also providing the required structural integrity for long life in an electrochemical environment within the cell. The increased internal porosity thus provides for an increased volume of lithium ions to diffuse through the electrode. In addition, increasing the internal porosity shortens the distance with which lithium ions travel through the electrode. As a result of the increased internal porosity, the charge/discharge rate capability of the electrode and resulting electrochemical cell increases.

In an embodiment, after the drying process, the first active material component comprises from about 28 to about 70 weight percent, the second active material component comprises from about 30 weight percent to about 70 weight percent, and the third non-active material portion comprises from about 0.01 weight percent to about 5 weight percent of the electrode.

The formulated electrode is an anode or negative electrode that is utilized within a secondary lithium-ion electrochemical cell. The electrochemical cell of the present invention further comprises a cathode composed of an electrically conductive material that serves as the other, positive electrode of the cell. The cathode is of solid materials and the electrochemical reaction at the cathode involves the conversion of lithium ions that migrate back and forth between the anode, i.e., a first electrode, and the cathode, i.e., a second electrode, into atomic or molecular forms. During discharge of the cell, lithium ions flow from the anode or negative electrode to the cathode or positive electrode. To recharge such secondary cells, lithium ions from the cathode or positive electrode are intercalated into the anode by applying an externally generated electrical potential to the cell. The applied recharging potential serves to draw lithium ions from the cathode material, through the electrolyte, and into the anode.

The solid cathode may comprise a cathode active material of a metal oxide, a lithiated metal oxide, a metal fluoride, a lithiated metal fluoride or combinations thereof as disclosed in U.S. patent application Ser. No. 14/745,747 to Hayner et al., which is assigned to the assignee of the present application and incorporated herein by reference. In an embodiment, the cathode active material comprises $LiNi_xCo_yAl_zO_2$, where x, y, and z are greater than 0 and wherein $x+y+z=1$. Other cathode active materials may include but are not limited to lithium cobalt oxide ($LiCoO_2$), lithium iron phosphate ($LiFePO_4$) and lithium manganese oxide ($LiMn_2O_4$). Additional cathode active materials may also include, but are not limited to, $LiNi_xMn_yCo_zO_2$, where $0.3 \leq x \leq 1.0$, $0 \leq y \leq 0.45$, and $0 \leq z \leq 0.4$ with $x+y+z=1$. Furthermore, the cathode active material may comprise $Li_{1+x}Ni_\alpha Mn_\beta Co_\gamma O_2$, where x ranges from about 0.05 to about 0.25, α ranges from about 0.1 to about 0.4, β ranges from about 0.4 to about 0.65, and γ ranges from about 0.05 to about 0.3.

In a larger scope, the cathode active material may comprise sulfur (S), lithium sulfide ($Li_2S$), a metal fluoride, a lithium metal fluoride, a lithium metal phosphate, and a lithium metal silicate where the metal may comprise a transition metal from the Periodic Table of Elements, such as iron (Fe), manganese (Mn), cobalt (Co), nickel (Ni), copper (Cu), vanadium (V), chromium (Cr), non-transition metals such as bismuth (Bi), and combinations thereof. Specific examples of cathode active materials may include $MF_x$ where $0 \leq x \leq 3$, $Li_xMF_x$ where $0 \leq x \leq 3$, $LiMPO_4$, $Li_2MSiO_4$ composite layered-spinel structures such as $LiMn_2O_4$-LiMO where M is a transition metal from the Periodic Table of Elements, such as iron (Fe), manganese (Mn), cobalt (Co), nickel (Ni), copper (Cu), vanadium (V), chromium (Cr), a non-transition metal such as bismuth (Bi), and combinations thereof. Lithium-rich positive active electrode materials of particular interest can also be represented approximately by the formula $Li_{1+x}Ni_aMn_bCo_cA_dO_{2-z}F_z$, where x ranges from about 0.01 to about 0.3, a ranges from about 0 to about 0.4, b ranges from about 0.2 to about 0.65, c ranges from 0 to about 0.46, d ranges from 0 to about 0.15 and Z ranges from 0 to about 0.2 with the proviso that both a and c are not zero, and where A is magnesium (Mg), strontium (Sr), barium (Ba), cadmium (Cd), zinc (Zn), aluminum (Al), gallium (Ga), boron (B), zirconium (Zr), titanium (Ti), calcium (Ca), selenium (Ce), yttrium (Y), niobium (Nb), chromium (Cr), iron (Fe), vanadium (V), lithium (Li) or combinations thereof. A person of ordinary skill in the art will recognize that additional ranges of parameter values within the explicit compositional ranges above contemplated and are within the present disclosure.

The cathode active material is formed by the chemical addition, reaction, or otherwise intimate contact of various oxides, phosphates, sulfides and/or metal elements, during thermal treatment, sol-gel formation, chemical vapor deposition, or hydrothermal synthesis in mixed states. The cathode active material thereby produced may contain metals, oxides, phosphates, and sulfides of Groups, IB, IIB, IIIB, IVB, VB, VIB, VIIB, VIII, and VIIA which includes the noble metals and/or other oxide and phosphate compounds. In an embodiment, a cathode active material is a reaction product of stoichiometric proportions of at least fully lithiated to non-lithiated, $LiNi_{0.8}Co_{0.15}Al_{0.05}O_2$.

The exemplary cell of the present invention further includes a separator to provide physical separation between the anode and cathode. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include non-woven glass, polypropylene, polyethylene, microporous material, glass fiber materials, ceramics, polytetrafluorethylene membrane commercially available under the designations ZITEX (Chemplast Inc.), polypropylene membrane, commercially available under the designation CELGARD (Celanese Plastic Company Inc.) and DEXIGLAS (C. H. Dexter, Div., Dexter Corp.).

The form of the separator typically is a sheet which is placed between the anode and cathode and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The exemplary electrochemical cell of the present application is activated with a nonaqueous, ionically conductive electrolyte operatively associated with the anode and the cathode. The electrolyte serves as a medium for migration of lithium ions between the anode and the cathode during electrochemical reactions of the cell, particularly during discharge and re-charge of the cell. The electrolyte is comprised of an inorganic salt dissolved in a nonaqueous solvent and an alkali metal salt dissolved in a mixture of low viscosity solvents including organic esters, ethers and dialkyl carbonates and high conductivity solvents including cyclic carbonates, cyclic esters, and cyclic amides.

Additional low viscosity solvents useful with the present invention include dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate (DEC), dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP), and mixtures thereof.

The electrolyte of the present invention comprises an inorganic salt having the general formula $YAF_6$ wherein Y is an alkali metal similar to the alkali metal comprising the anode, and A is an element selected from the group consisting of phosphorous, arsenic and antimony. Examples of salts yielding $AF_6$ are hexafluorophosphate ($PF_6$), hexafluoroarsenate ($AsF_6$) and hexafluoroantimonate ($SbF_6$). In addition, other salts may comprise lithium salts including $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6FSO_3$, $LiO_2CCF_3$, $LiSO_6F$, $LiB(C_6H_5)_4$, $LiCF_3SO_3$, and mixtures thereof. Alternatively, the electrolyte comprises at least one ion-forming alkali metal salt of hexafluoroarsenate or hexafluorophosphate dissolved in a suitable organic solvent wherein the ion-forming alkali metal is similar to the alkali metal comprising the anode. The alkali metal salt of the electrolyte comprises either lithium hexafluoroarsenate or lithium hexafluorophosphate dissolved in a 50/50 solvent mixture (by volume) of EC/DMC. In an embodiment, the electrolyte may comprise 0.8M to 1.5M $LiAsF_6$ or $LiPF_6$ dissolved in a 50:50 mixture, by volume, of dimethyl carbonate and ethylene carbonate.

The form of the electrochemical cell is a lithium ion cell wherein the anode/cathode couple is inserted into a conductive metal casing. An example material for the casing is stainless steel, although titanium, mild steel, nickel, nickel-plated mild steel, and aluminum are also suitable. The casing may comprise a metallic lid having a sufficient number of openings to accommodate a glass-to-metal seal/terminal pin feedthrough for the cathode and anode. An additional opening may be provided for electrolyte filling. The casing header comprises elements having compatibility with the other components of the electrochemical cell and is resistant to corrosion. The cell is thereafter filled with the electrolyte solution described hereinabove and hermetically sealed, such as by close-welding a stainless steel plug over the fill hole, but not limited thereto. The cell of the present invention can also be constructed in a case-positive design.

The glass-to-metal seal may comprise a corrosion resistant glass having from between about 0% to about 50% by weight silica such as CABAL 12, TA 23 or FUSITE MSG-12, FUSITE A-485, FUSITE 425 or FUSITE 435. The positive terminal pin feedthrough may comprise titanium although molybdenum and aluminum can also be used. The cell header comprises elements having compatibility with the other components of the electrochemical cell and is resistant to corrosion. The cell is thereafter filled with the electrolyte described hereinabove and hermetically sealed such as by close-welding a stainless steel ball over the fill hole, but not limited thereto. When the ionically conductive electrolyte becomes operatively associated with the anode and the cathode of the cell, an electrical potential difference is developed between terminals operatively connected to the anode and the cathode. During discharge, lithium ions migrate from the anode, i.e., the negative electrode to the cathode, i.e., the positive electrode. During recharge, lithium ions migrate in the opposite direction from the cathode to the anode. Migration of the lithium ions between the anode and cathode occurs in atomic or molecular forms.

Sample CR2032-type lithium-ion coin cells were constructed with anodes fabricated using the material formulation and fabrication method thereof of the present application. Metallic lithium was used as the counter electrode. The working electrode was fabricated by first pasting a mixture comprising the electrochemically active particles of the present invention, carbon black and poly(acrylic acid) binder with a weight ratio of 75:5:20 onto a copper foil (12 mm diameter). The electrode was dried at 80° C. for 12 h under vacuum before being assembled into a coin cell in an Ar-filled glove box. A microporous glass-fiber membrane (Whatman) was used as a separator.

Test Group 1

Three lithium-ion Test Group 1 cells were constructed. Each cell was constructed having an anode that comprised 0.35 g of the electrochemically active material fabricated per Example 1. The electrochemically active material was mixed with 0.02 g of carbon black and 0.09 g of lithium polyacrylate binder. The resulting slurry was applied to a copper current collector foil with a loading of 2.0 mAh/cm$^2$ and a density of 0.9 g/cc. The slurry was dried and calendared to an internal porosity of 40% to form the electrode. The electrode was assembled into a cell having a counter electrode composed of lithium. An electrolyte comprising 1.2M $LiPF_6$ in EC:DMC (30:70 weight percent) and 20 weight percent FEC was injected into the test cell.

Test Group 2

Three lithium-ion Test Group 2 cells were constructed. Each cell was constructed having an anode that comprised 0.35 g of the electrochemically active material fabricated per Example 2. The electrochemically active material was mixed with 0.02 g carbon black and 0.09 g lithium polyacrylate binder. The resulting slurry was applied to a copper current collector foil with a loading of 2.0 mAh/cm² and a density of 0.9 g/cc. The slurry was dried and calendared to an internal porosity of 40% to form the electrode. The electrode was assembled into a cell having a counter electrode composed of lithium. An electrolyte comprising 1.2M LiPF$_6$ in EC:DMC (30:70 weight percent) and 20 weight percent FEC was used in the test cells.

Comparative Cells

In addition to the test cells having electrodes comprising the electrochemically active material of the present application, lithium electrochemical comparative cells were constructed and tested in comparison. In an embodiment, the lithium electrochemical comparative cells were constructed with anodes that included an anode active material comprising crumpled graphene encapsulated silicon fabricated per the Comparative Example as disclosed in U.S. patent application publication number 2013/0199605 to Huang et al., which is incorporated herein by reference.

Comparative Group

Three lithium-ion comparative group cells were constructed. Each cell was constructed having an anode that comprised 0.35 g of the electrochemically active comparative material was mixed with 0.02 g carbon black and 0.09 g lithium polyacrylate binder. The resulting slurry was applied to a copper current collector foil with a loading of 2.0 mAh/cm² and a density of 0.9 g/cc. The slurry was dried and calendared to an internal porosity of 40% to form the electrode. The electrode was assembled into a cell having a counter electrode composed of lithium. An electrolyte comprising 1.2M LiPF$_6$ in EC:DMC (30:70 weight percent) and 20 weight percent FEC was used in the comparative cells.

Electrochemical Testing

Charge/discharge testing was performed on all the test and comparative lithium ion cells. Measurements were conducted with an Arbin Instruments BT2000 at various current densities between voltages of 0.02 and 1.5 V vs. Li/Li$^+$. Lithium insertion into the Si electrode was referred to as discharge, and extraction was referred to as charge. The capacity was determined based on the weight of the electrochemically active particles. A discharge rate sequence that comprised, C/20 for the first cycle, C/10 for the second cycle, C/5 for the third cycle, and C/2 for all subsequent cycles to a predetermined threshold voltage of about 1.5 V was used.

Figure 5:
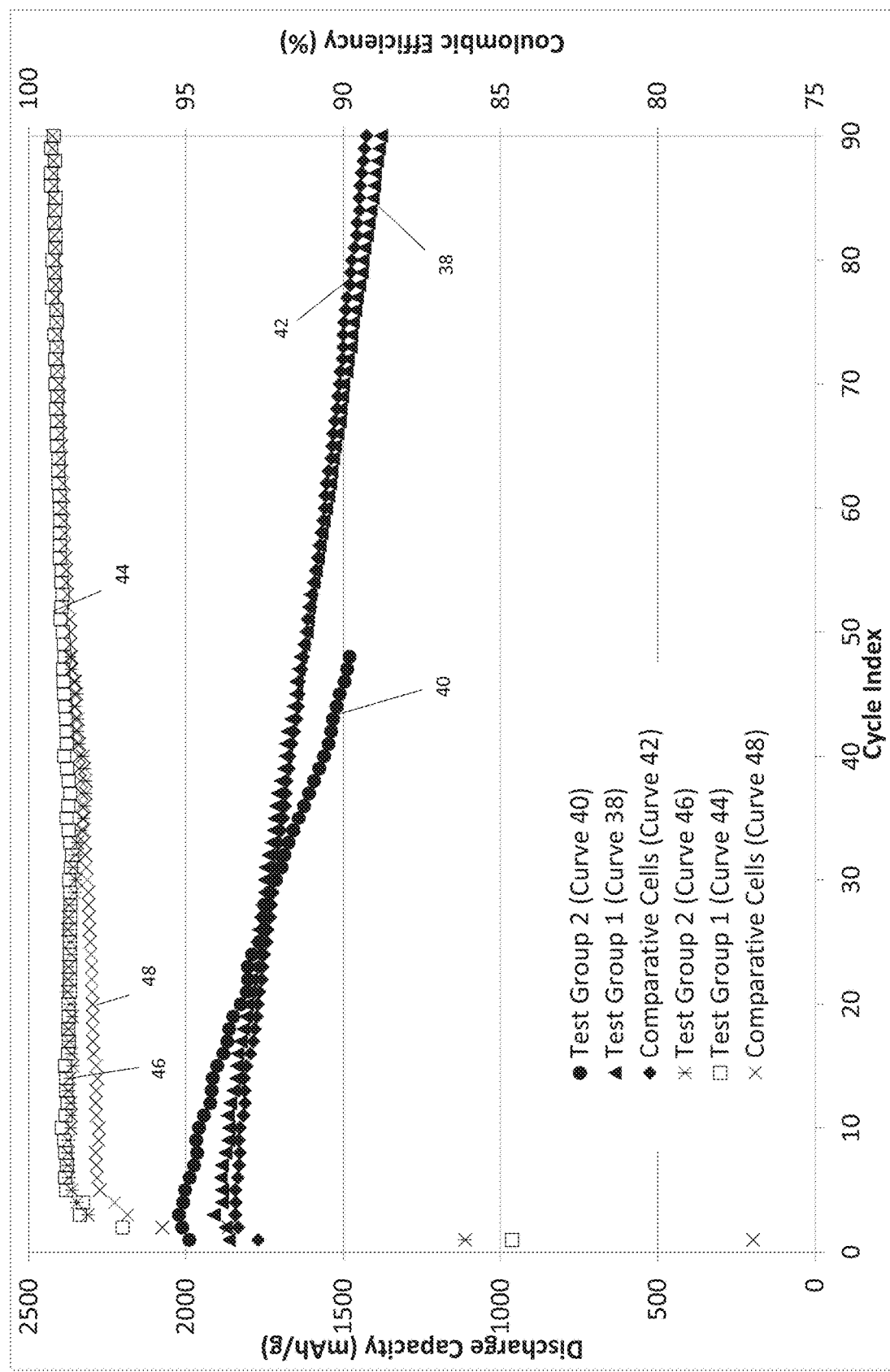
FIG. 5 shows the discharge capacity and Coulombic efficiency test results of lithium ion cells comprising an anode consisting of the graphene silicon electrochemically active material of the present application constructed therewithin.

FIG. 5 illustrates the average discharge capacity (mAh/g) and Coulombic efficiency (in percent) exhibited by the test and comparative lithium ion coin cells, as discussed above. Average discharge capacity as a function of cycle number for the Test Group 1 cells is shown as curve 38. Average discharge capacity as a function of cycle number for the Test Group 2 cells is shown as curve 40. Average discharge capacity as a function of cycle number for the comparative cells is shown as curve 42. In addition, average Coulombic efficiency as a function of cycle number for the Test Group 1 cells is shown as curve 44. Average Coulombic efficiency for the Test Group 2 cells is shown as curve 46. Average Coulombic efficiency as a function of cycle number for the comparative cells is shown as curve 48.

As illustrated, Test Group 1 cells, which were constructed with an anode composed of the Example I electrochemically active material of the present application, exhibited a discharge capacity that quickly increased to about 1,911 mAh/g and a Coulombic efficiency of about 98 percent after three cycles. In addition, the Test Group 1 cells exhibited a first cycle Coulombic efficiency of about 84.6 percent. Furthermore, Test Group 2 cells, constructed with an anode composed of the Example 2 material, exhibited a discharge capacity of about 2,022.5 mAh/g and a Coulombic efficiency of about 98.1 percent after three cycles. The Test Group 2 cells exhibited a first Coulombic efficiency of 86.1 percent.

In comparison, the comparative cells constructed with anodes comprising the comparative electrochemically active material exhibited a discharge capacity of about 1,843 mAh/g and a Coulombic efficiency of about 96.9 percent after three cycles. The comparative cells exhibited a first Coulombic efficiency of about 77 percent.

Table III summaries the discharge capacity and Coulombic efficiency test results of the test and comparative cells in relation to the particle size and particle surface area of the electrochemically active materials that comprised anodes of the cells, respectively.

TABLE III

| Sample ID | Particle Size (μm) | BET Surface Area (m²/g) | FCE (1$^{st}$ Coul Eff) | Avg Coul Eff (Cycles 1-45) | Avg Dis Cap (Cycles 1-45) | Avg Coul Eff (Cycle 3) | Avg Dis Cap (Cycle 3) |
|---|---|---|---|---|---|---|---|
| Comp Cells | 3.3 | 80 | 77 | 97.5 | 1,752.8 | 96.9 | 1,843 |
| Test Group 1 | 3.3 | 60 | 84.6 | 98.4 | 1,785.8 | 98.4 | 1,911.6 |
| Test Group 2 | 3.3 | 40 | 86.1 | 98.2 | 1,787.5 | 98.1 | 2,022.5 |

In comparison, the comparative cells constructed with anodes comprising the active material of Huang, as disclosed in U.S. patent application publication number 2013/0344392, exhibited a first cycle Coulombic efficiency of about 77 percent, which is significantly less than the first Coulombic efficiency of the electrochemically active materials that comprised the cells of Test Groups 1 and 2. As shown in Table III, Test Groups 1 and 2 cells exhibited a first cycle Coulombic efficiency of about 84.6 percent and 86.1 percent, respectively. The increased Coulombic efficiency of the electrochemically active material of the present application is believed to be attributed to a number of factors.

First, the electrochemically active material of the present application has a reduced particle surface area. In comparison to the comparative electrochemically active material, fabricated per Huang as disclosed in U.S. patent application publication number 2013/0344392, that comprised the comparative cells, the electrochemically active material of Test Groups 1 and 2 comprised a smaller BET surface area of about 60 m²/g and 40 m²/g, respectively, with an average particle size of about 3.3 μm. It is noted that while the particle size of the comparative electrochemically active material was measured to be about 3.3 μm, the BET surface area of the comparative material was measured to be about 80 m²/g. This reduction in BET surface area while having the same particle size is attributed to the increased weight percent silicon in the composite particle in addition to adjusting processing parameters, such as those detailed in Table I.

Second, the increased Coulombic efficiency of the electrochemically active material that comprised Test Group 1 and 2 cells of the present application is attributable to processing differences of the composite particles. In addition, the increased Coulombic efficiency is likely due to an irreversible lithium reaction with the residual functional groups in the reduced graphene oxide and the initial SEI layer formation. The increased Coulombic efficiency for the first cycle suggests the effective insulation of silicon from the electrolyte solvents by the reduced graphene oxide shell. The structure of the reduced graphene oxide shell of the material of the present application enables the second constituent, e.g., silicon, therewithin to expand with minimized cracking. The second constituent, e.g., silicon, is effectively protected while maintaining electrical contact thereby contributing to increased Coulombic efficiencies throughout cycling. The decreased surface area of Test Groups 1 and 2 reflect the decrease in the number of active sites that are available for the electrolyte components to decompose on the surface and generate the solid electrolyte interphase.

Additionally, there are less active sites for lithium ions to become trapped and contribute to lost capacity. The minimized loss of lithium ions and decreased electrolyte decomposition lead to improved Coulombic efficiency with Test Groups 1 and 2 relative to the Comparative Example. Additionally, higher Coulombic efficiency and less SEI growth can lead to lower electronic and ionic resistance to electron and lithium ion transport. With reduced resistance, more charge can be transferred during cycling, which will lead to higher capacity, as observed with Test Groups 1 and 2.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An electrochemically active material comprising composite particles, each composite particle comprising electrochemically active core particles encapsulated within a shell consisting of a graphene material, wherein:
    the graphene material is selected from graphene, reduced graphene oxide, graphene oxide, or combinations thereof;
    the composite particles have an average particle size ranging from 1 µm to 20 µm;
    the composite particles have a BET surface area of less than about 75 $m^2/g$, due to a structure of the graphene material;
    the core particles comprise silicon, silicon oxide, or a combination thereof and have an average particle size ranging from 50 nm to 100 nm; and
    the shell encapsulates the core particles such that a void space is present between the core particles and the shell, and the shell is configured to permit expansion of the core particles during lithiation, without rupturing the shell.

2. The electrochemically active material of claim 1, wherein the BET surface area ranges from about 5 $m^2/g$ to about 40 $m^2/g$.

3. The electrochemically active material of claim 1, wherein the BET surface area of the composite particles ranges from about 15 $m^2/g$ to about 65 $m^2/g$.

4. The electrochemically active material of claim 1, wherein the BET surface area of the composite particles ranges from about 35 $m^2/g$ to about 60 $m^2/g$.

5. The electrochemically active material of claim 1, wherein the composite particles have a silicon to graphene material weight ratio ranging from 70:30 to 80:20.

6. The electrochemically active material of claim 1, wherein the composite particles have a spherical structure.

7. The electrochemically active material of claim 1, wherein the core particles comprise at least 50 weight percent of the total weight of the composite particles.

8. The electrochemically active material of claim 1, wherein the composite particles have an average particle size ranging from about 2.3 µm to about 4.3 µm.

9. An electrode comprising:
    the electrochemically active material of claim 1; and
    a binder.

10. The electrode of claim 9, wherein the binder comprises polytetrafluoroethylene (PTFE), polyvinylidene fluoride (PVDF), poly(acrylic) acid, polyethylenetetrafluoroethylene (ETFE), polyamides, and polyimides, polyethylene, styrene-butadiene rubber, cellulose, polyacrylate rubber, or mixtures thereof.

11. The electrode of claim 9, further comprising a conductive additive selected from the group consisting of carbon black, an electrically conductive polymer, graphite, a metallic powder, nickel, aluminum, titanium, stainless steel, and any combination thereof.

12. A battery comprising:
    an anode comprising the electrode of claim 9;
    a cathode;
    a casing housing the anode and cathode; and
    an electrolyte disposed between the anode and cathode.

13. An electrode material comprising composite particles, each composite particle comprising:
    core particles comprising silicon, silicon oxide, or a combination thereof; and
    a shell that encapsulates the core particles and consists of a graphene material selected from graphene, reduced graphene oxide, graphene oxide, or combinations thereof, wherein:
    the core particles have an average particle size ranging from 50 nm to 100 nm;
    the composite particles have a particle size greater than 1 micrometer;
    the composite particles have a BET surface area of less than 80 $m^2/g$, due to a structure of the graphene material; and
    the shell encapsulates the core particles such that a void space is present between the core particles and the shell, and the shell is configured to permit expansion of the core particles during lithiation, without rupturing the shell.

14. The electrode material of claim 13, wherein:
    the composite particles have a silicon to graphene material weight ratio ranging from 70:30 to 80:20
    the composite particles have an average particle size ranging from 2.3 µm to 4.3 µm; and
    the BET surface area ranges from about 35 $m^2/g$ to about 60 $m^2/g$.

15. The electrode material of claim 13, wherein the composite particles have a BET surface area of less than 35 m$^2$/g.

16. A battery comprising:
- an anode comprising the electrode material of claim 13;
- a cathode;
- a casing housing the anode and cathode; and
- an electrolyte disposed between the anode and the cathode,
- wherein the shell isolates the core particles and prevents the core particles from contacting the electrolyte, wherein a stable SEI layer can form only outside the shell.

17. The electrode material of claim 13, wherein the shell is not a conformal coating formed on the core particles.

18. The electrochemically active material of claim 1, wherein the shell is not a conformal coating formed on the core particles.

* * * * *